United States Patent
Hanson, Jr. et al.

(10) Patent No.: US 7,695,056 B2
(45) Date of Patent: Apr. 13, 2010

(54) FLOORBOARD FOR LIGHT-WEIGHT VEHICLE

(75) Inventors: Donald S. Hanson, Jr., Evans, GA (US); Anthony R. Rossello, Grovetown, GA (US)

(73) Assignee: Textron Innovations Inc., Providence, RI (US)

( * ) Notice: Subject to any disclaimer, the term of this patent is extended or adjusted under 35 U.S.C. 154(b) by 943 days.

(21) Appl. No.: 11/381,907

(22) Filed: May 5, 2006

(65) Prior Publication Data

US 2007/0257519 A1 Nov. 8, 2007

(51) Int. Cl.
B62D 25/20 (2006.01)
(52) U.S. Cl. .............. 296/204; 296/187.08; 296/193.07
(58) Field of Classification Search ............ 296/187.08, 296/187.11, 193.05, 193.07, 204, 75, 209; 280/DIG. 5, 781; 180/90.6
See application file for complete search history.

(56) References Cited

U.S. PATENT DOCUMENTS

| | | | | |
|---|---|---|---|---|
| 4,898,419 | A * | 2/1990 | Kenmochi et al. .......... 296/204 |
| 5,975,625 | A | 11/1999 | Simplicean | |
| 6,126,219 | A * | 10/2000 | Wilkinson et al. ....... 296/26.01 |
| 6,224,134 | B1 * | 5/2001 | Johnson et al. ............... 296/75 |
| 6,431,641 | B2 * | 8/2002 | Miyasaka .............. 296/203.03 |
| 6,604,781 | B2 * | 8/2003 | Uchida ........................ 296/204 |
| 6,688,674 | B2 * | 2/2004 | Sato et al. ................. 296/185.1 |
| 6,805,401 | B2 * | 10/2004 | Hayashi et al. ............. 296/204 |
| 6,854,791 | B1 * | 2/2005 | Jaggi ..................... 296/203.01 |
| 6,857,692 | B2 * | 2/2005 | Cardimen et al. ........... 296/204 |
| 6,902,228 | B2 * | 6/2005 | Kikuchi .................. 296/193.07 |
| 7,017,980 | B1 * | 3/2006 | Bejin et al. ............. 296/193.07 |
| 7,118,167 | B2 * | 10/2006 | Nakamura et al. ..... 296/193.07 |
| 7,195,306 | B2 * | 3/2007 | Egawa et al. ........... 296/187.08 |
| 7,338,115 | B2 * | 3/2008 | Rocheblave et al. ... 296/193.07 |
| 7,367,417 | B2 * | 5/2008 | Inui et al. .................. 180/89.2 |
| 7,422,082 | B2 * | 9/2008 | Reffitt ........................ 180/90.6 |
| 2003/0137163 | A1 * | 7/2003 | Hayashi et al. ............. 296/204 |
| 2005/0046236 | A1 * | 3/2005 | Nakamura et al. ..... 296/193.07 |
| 2006/0232105 | A1 * | 10/2006 | Egawa et al. ........... 296/193.07 |
| 2006/0254835 | A1 | 11/2006 | Reffitt | |
| 2007/0096508 | A1 * | 5/2007 | Rocheblave et al. ... 296/193.07 |
| 2007/0257519 | A1 * | 11/2007 | Hanson et al. .............. 296/204 |

FOREIGN PATENT DOCUMENTS

JP 2006198048 8/2006
WO 2004/067360 A1 8/2004

* cited by examiner

*Primary Examiner*—Glenn Dayoan
*Assistant Examiner*—Gregory Blankenship
(74) *Attorney, Agent, or Firm*—Harness, Dickey & Pierce, P.L.C.

(57) ABSTRACT

A light-weight utility vehicle floorboard is provided having a pair of frame channels formed in an interior portion of the floorboard. The frame channels receive a pair of vehicle frame struts therewithin. The floorboard additionally has formed therein a plurality of load dispersing structural ribs (LDSRs) between the frame channels and sides of the floorboard. The LDSRs spread a force generated by a low-speed side impact to the floorboard such that the vehicle frame struts are not damaged. The LDSRs also transfer passenger loads exerted on the outer portions of the floorboard to the DS and PS frame struts.

25 Claims, 12 Drawing Sheets

FLOORBOARD FOR LIGHT-WEIGHT VEHICLE

FIELD

The present disclosure relates to light-weight utility vehicles such as golf cars and small maintenance, shuttle or cargo vehicles and to a molded one-piece floorboard assembly for a light-weight utility vehicle.

BACKGROUND

The statements in this section merely provide background information related to the present disclosure and may not constitute prior art.

Generally, today's light-weight utility vehicles, e.g., maintenance vehicles, shuttle vehicles and golf cars, have a two-piece floorboard including a bottom floor portion and a front panel portion. The bottom floor portion is typically fabricated of metal and the front panel portion is usually fabricated of plastic. These two-piece floorboards are typically riveted to a metal, e.g., aluminum or steel, frame along opposing outer edges, or sides, of the floorboard portions. Light-weight utility vehicles having such floorboards so constructed are very susceptible to incurring frame damage from a low speed side impact. That is, the floorboard provides no impact protection to the frame. Thus, should a low speed side impact occur, the frame effectively directly incurs the impact and is readily damaged.

Additionally, to attach other components of the utility vehicle to the bottom floor portion, for example, a brake and accelerator assembly, a fuel tank, a battery mount, body panels and an electronic controller, requires bolt holes to be drilled into and/or welds to be made to the bottom portion. Thus, mounting such components to the floorboard is labor and cost intensive.

Therefore, it is desirable to provide a light-weight utility vehicle floorboard that will provide impact protection to vehicle frame and simplify the mounting of various other vehicle components to the floorboard during assembly of the vehicle.

SUMMARY

A one-piece molded floorboard for a light-weight utility vehicle is provided in various embodiments. The floorboard includes a bottom panel and a front panel extending upwardly from a front of the bottom panel. The bottom panel includes a driver-side (DS) frame channel formed in an interior portion of the floorboard for receiving a DS vehicle frame strut therewithin. The bottom panel additionally includes a passenger-side (PS) frame channel formed in the interior portion of the floorboard for receiving a PS vehicle frame strut therewithin. For example, in some embodiments, the DS and PS frame channels are formed within approximately the center two-thirds to the center one-third of the floorboard.

Furthermore, a plurality of load dispersing structural ribs (LDSRs) are formed in the floorboard bottom panel between the DS frame channel and a DS side of the floorboard. A plurality of the LDSRs are also formed in the floorboard bottom panel between the PS frame channel and a PS side of the floorboard. The LDSRs prevent damage to the frame struts that may be inflicted by a low-speed side impact to the floorboard. More particularly, rather than the force of the impact being concentrated at a small area or single point of the impact side frame strut, the LDSRs broadly absorb and spread a force. That is, the force generated by a low-speed side impact is absorbed and spread over a large portion of the impact side frame strut, i.e., the frame strut on the side of the impact.

Since the frame channels are formed in the interior portion of the floorboard, with the vehicle frame struts located within the frame channels, a considerable portion of the floorboard is cantilevered, or suspended, outward beyond each frame strut to the respective side of the floorboard. The LDSRs additionally provide structural strength to support passenger loads on the cantilevered portions of the floorboard between the DS and PS frame channels and the respective sides of the floorboard.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
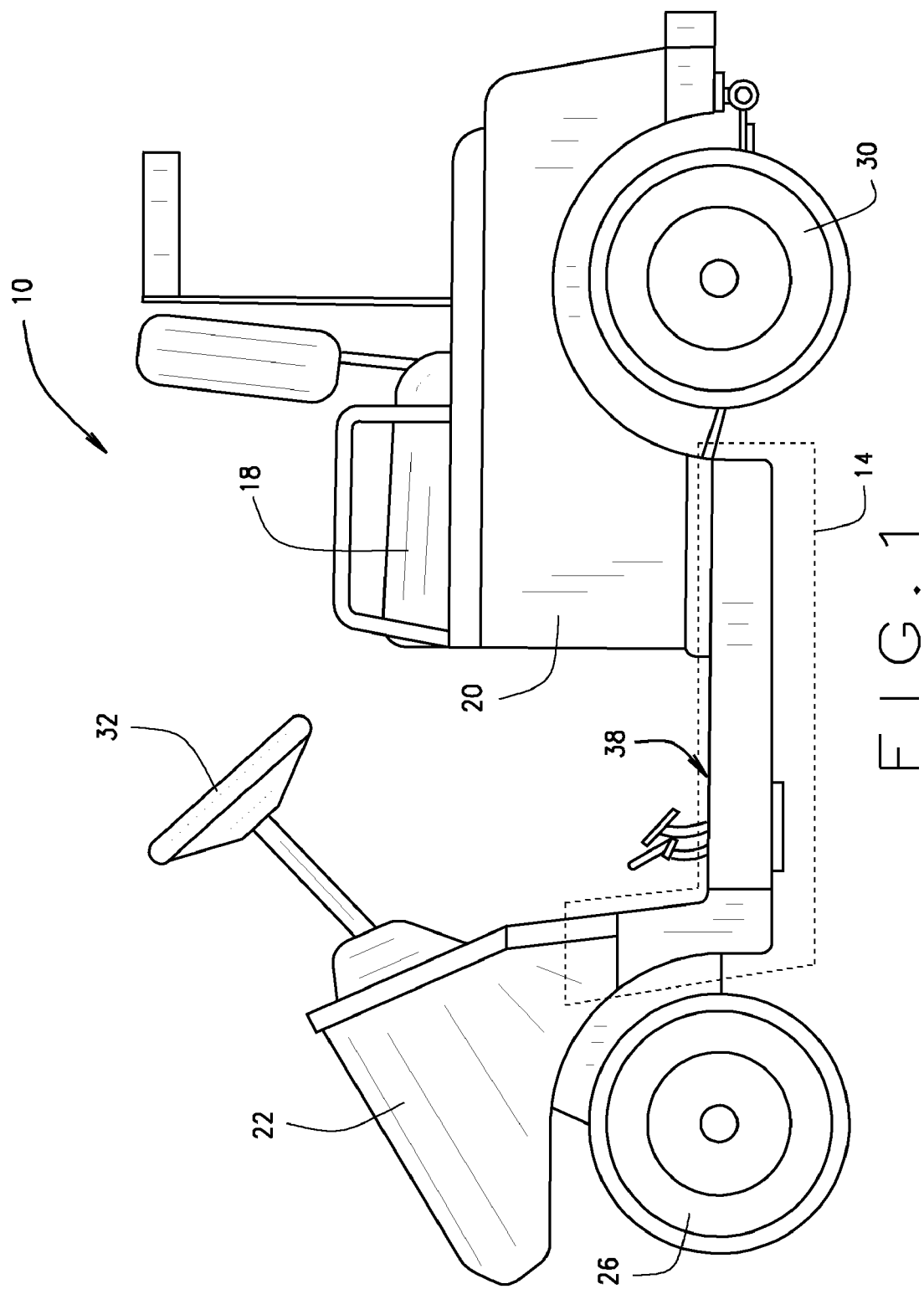
FIG. 1 is a side view of a light-weight utility vehicle including a floorboard assembly, in accordance with various embodiments of the present invention.

The following description of various embodiments is merely exemplary in nature and is in no way intended to limit the present disclosure, application, or uses. Throughout this specification, like reference numerals will be used to refer to like elements.

FIG. 1 illustrates a light-weight utility vehicle 10, such as a small cargo/maintenance vehicle, a shuttle vehicle or a golf car, that includes a floorboard assembly 14, in accordance with various embodiments. The vehicle 10 also generally includes a seat assembly 18 mounted to a rear body section 20, a front body section 22, a pair of front wheels 26 that operate to steer the vehicle 10. Additionally, the vehicle 10 generally includes a pair of rear wheels 30, wherein at least one of the rear wheels 30 functions as a drive wheel for propelling vehicle 10, a steering wheel 34 used to control a steering angle of the front wheels 30 and a pedal box assembly 38 comprising a brake pedal subassembly and an accelerator pedal subassembly.

Figure 2:
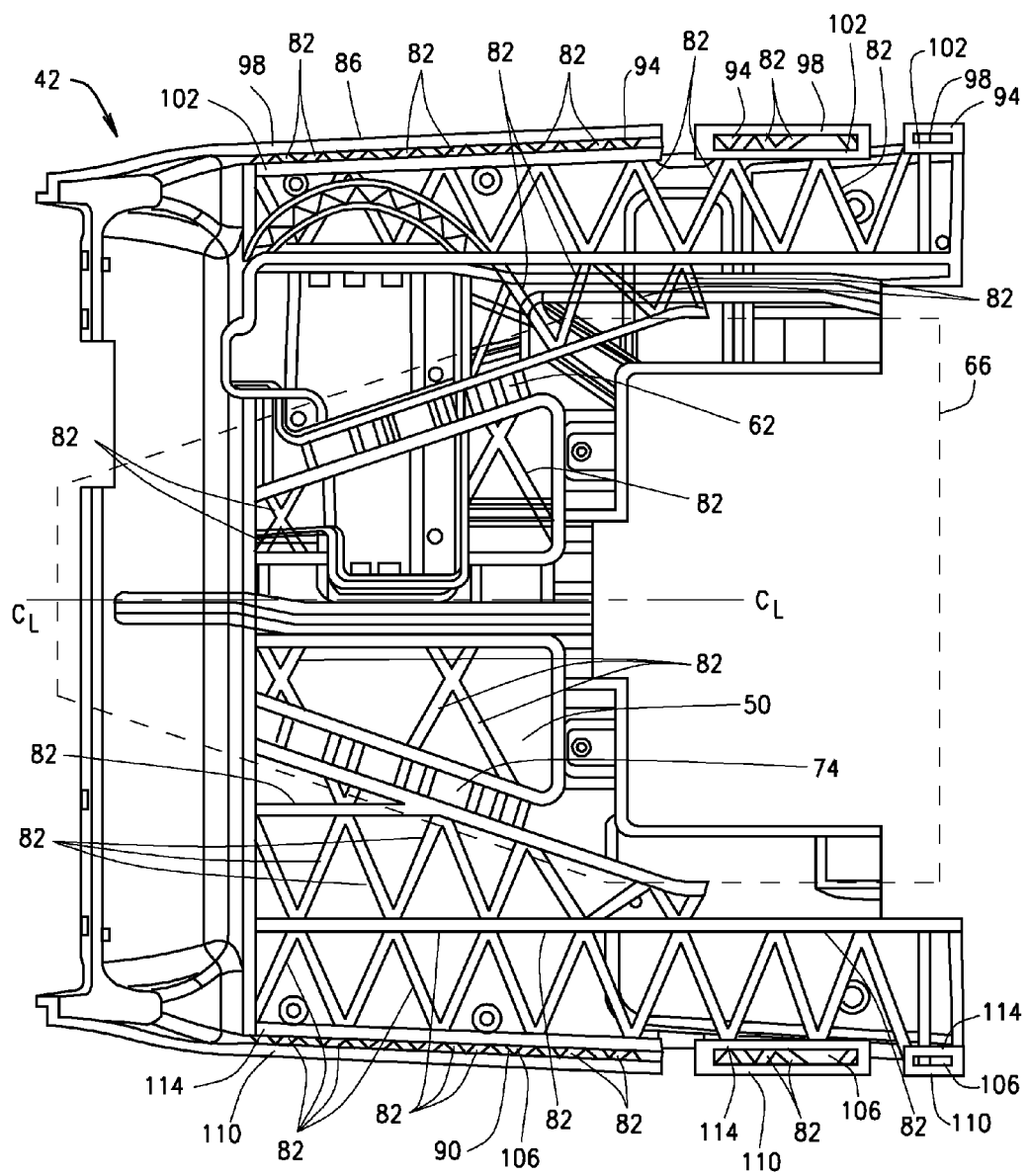
FIG. 2 is a bottom view of a one-piece molded floorboard included in the floorboard assembly shown in FIG. 1, illustrating an underside of the floorboard.
Figure 3:
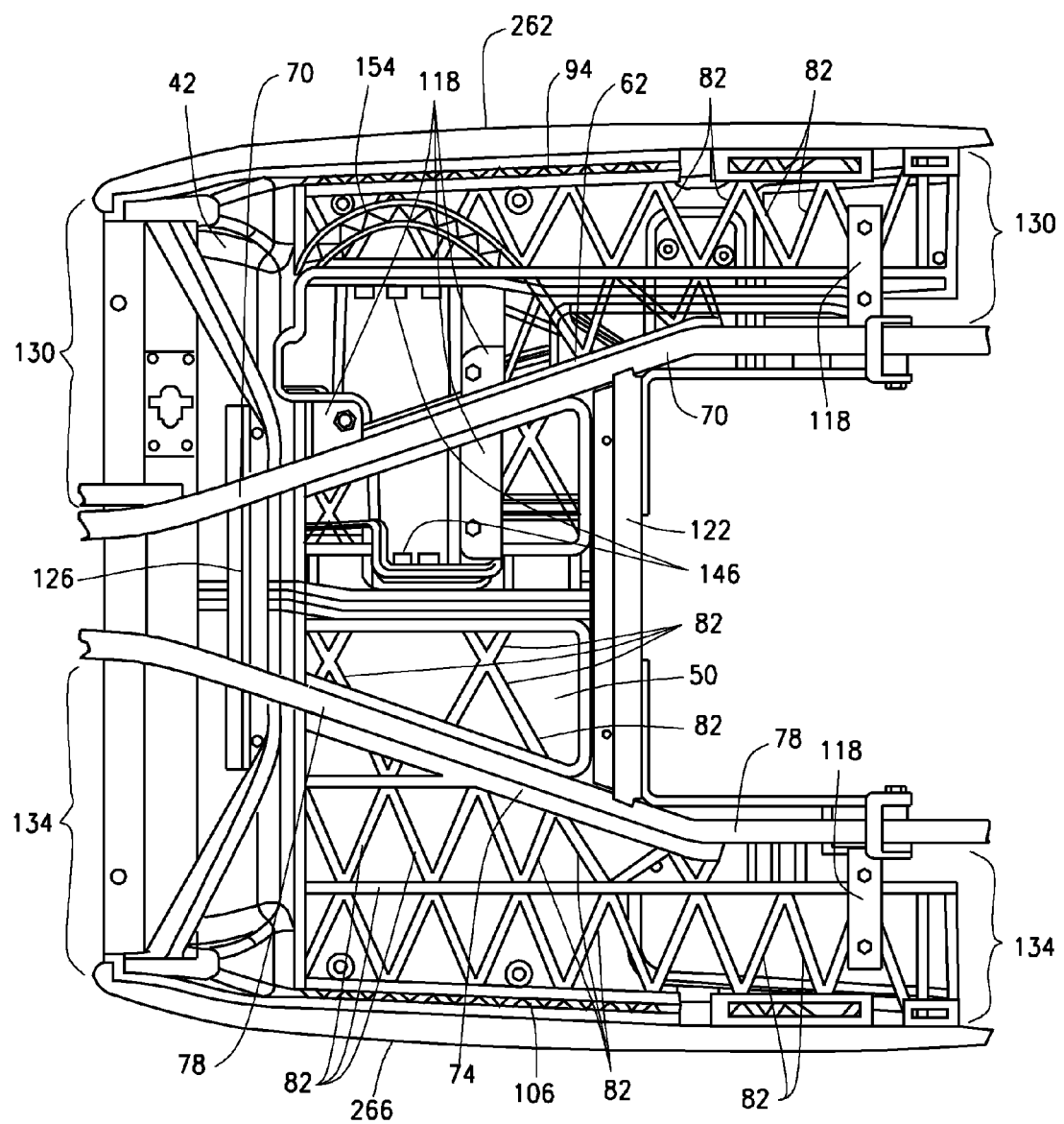
FIG. 3 is a bottom view of the floorboard assembly shown in FIG. 1 mounted to a frame of the light-weight utility vehicle shown in FIG. 1.
Figure 4:
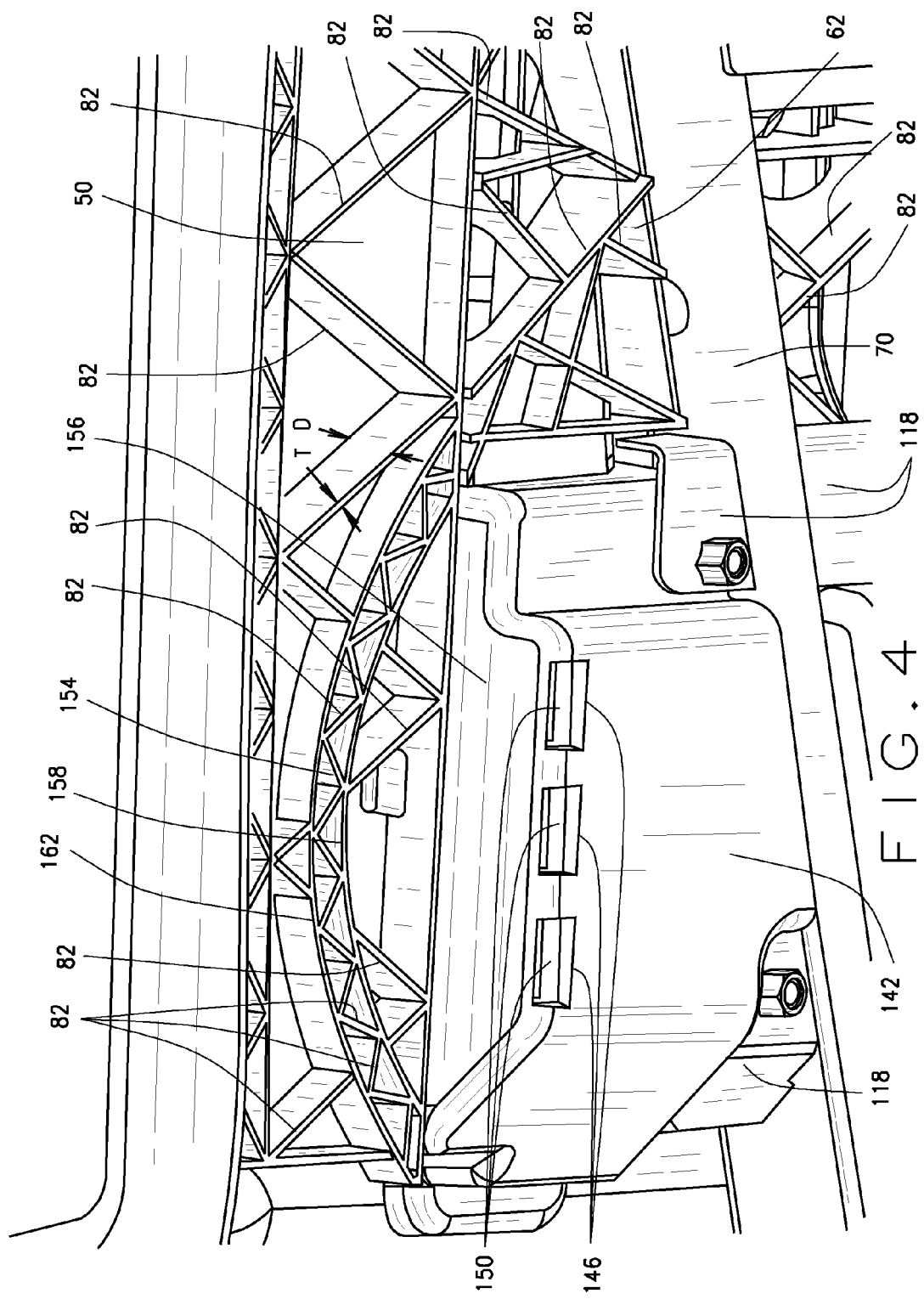
FIG. 4 is a sectional view of the underside of the floorboard shown in FIG. 2.
Figure 5:
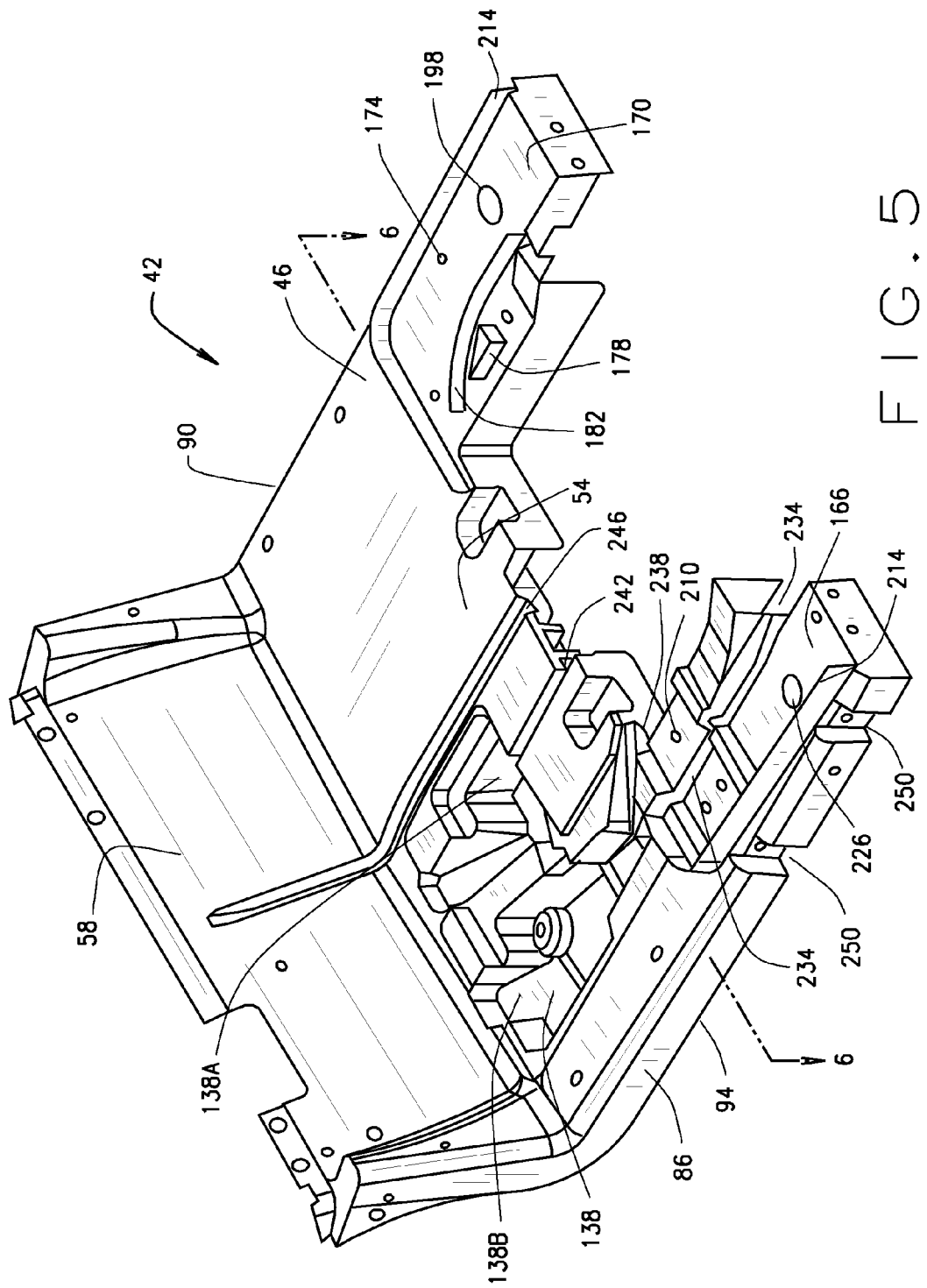
FIG. 5 is a top view of the floorboard shown in FIG. 2, illustrating a top surface of the floorboard.

Referring now to FIGS. 2, 3, 4 and 5, the floorboard assembly 14 includes a one-piece molded floorboard 42 having a top surface 46, shown in FIG. 5, and an underside 50, shown in FIGS. 2, 3 and 4. The floorboard 42 can be molded from any suitable material such as glass reinforced polypropylene, polyethylene, fiberglass, and various other plastics, resins or any combination thereof. Additionally, the floorboard 42 can be molded using any suitable molding process, for example, in various embodiments the floorboard 42 is injection molded. Furthermore, in various implementations, the floorboard 42 is molded using a foaming agent, e.g., 3% foaming agent, to reduce the plastic content and dimensionally stabilize the floorboard 42. The floorboard 42 includes a bottom panel 54 and a front panel 58 extending generally upward from a front of the bottom panel 54. The underside 50 of the bottom panel 54 includes a driver-side (DS) frame channel 62 formed in an interior portion 66, shown in FIG. 2, of the underside 50 of the floorboard bottom panel 54 for receiving a DS vehicle frame strut 70 therewithin. Similarly, a passenger-side (PS) frame channel 74 is formed in the interior portion 66 of the floorboard bottom panel 54 for receiving a PS vehicle frame strut 78 therewithin.

It should be understood that the interior portion 66 designates a longitudinal section of the floorboard 42 adjacent a longitudinal center line $C_L$. For example, in various embodiments, the interior portion 66 can include approximately the longitudinal center two-thirds of the floorboard 42, approximately the longitudinal center one-third of the floorboard 42, or any variation therebetween. As illustrated throughout the various figures, the frame channels 62 and 74 and respective frame struts 70 and 78 are further apart at the rear of the floorboard 42 and taper inward toward the center line $C_L$ as they extend toward the front of the floorboard 42. In this case, the interior portion 66 is wider at the rear of the floorboard 42, and tapers to a narrower portion at the front of the floorboard 42. For example, the interior portion 66 comprises a longitudinal center portion of the floorboard that is approximately the center two-thirds of the floorboard 42 at the rear and narrows to approximately the center one-third of the floorboard 42 at the front.

The underside 50 of the one-piece floorboard 42 further includes a plurality of load dispersing structural ribs (LDSRs) 82 formed between the DS frame channel 62 and a DS side 86 of the floorboard 42 and between the PS frame channel 74 and a PS side 90 of the floorboard 42. Additional LDSRs 82 are formed between the DS and PS frame channels 62 and 74. Generally, the LDSRs 82 absorb and disperse, or spread, a force generated by a low-speed side impact to the floorboard 42 such that the DS and PS frame struts 70 and 78 are not damaged. More particularly, when an impact is imparted on either of the floorboard sides 86 or 90, the LDSRs 82 absorb and distribute the force generated by the impact along a length of the impact side frame strut 70 or 78. An exemplary low-speed impact would be an impact of approximately 1500 lbs to 1700 lbs, at approximately 1 mph to 25 mph, at an angle of approximately 5° to 50° to the DS or PS side 86 or 90 of the floorboard assembly 14. For example, in various embodiments, the LDSRs 82 can absorb and distribute the force of a 1600 pound load, 5 mph, 20° collision with a pole or tree along one of the sides 86 or 90, without damaging the DS and PS frame struts 70 and 78.

Additionally, the LDSRs 82 provide structural strength to the floorboard 42 to support passenger loads between the DS and PS frame channels 62 and 74 and the respective sides 86 and 90 of the floorboard 42. That is, the LDSRs 82 provide load bearing structural support to the floorboard 42 such that the floorboard 42 will bear loads exerted on the top surface 46 of the floorboard 42 by a person, or persons, utilizing the vehicle 10, e.g., a vehicle driver and/or a vehicle passenger. More particularly, the LDSRs 82 transfer passenger loads from the respective floorboard sides 86 and 90 to the frame struts 70 and 78.

A DS side rail portion 94 is formed into the floorboard 42 along the DS floorboard side 86. The DS side rail portion 94 includes a plurality of closely spaced, short LDSRs 82 diagonally formed between a DS side rail outer wall 98 and a DS side rail inner wall 102 that provide substantial rigidity and stiffness along the DS floorboard side 86. Similarly, a PS side rail portion 106 is formed along the PS floorboard side 90 and includes a plurality of closely spaced, short LDSRs 82. The closely spaced, short LDSRs 82 are diagonally formed between a PS side rail outer wall 110 and a PS side rail inner wall 114 and provide substantial rigidity and stiffness along the PS floorboard side 90.

Referring particularly to FIG. 3, the floorboard 42 is coupled to the frame struts 70 and 78 in any suitable manner. For example, in various embodiments the frame struts 70 and 78 include mounting flanges 118 to which the floorboard 42 is coupled, e.g., bolted. To further secure, or couple the floorboard 42 to the frame struts 70 and 78, a rear cross member 122 and a forward cross member 126 may be coupled between the frame struts 70 and 78. The rear of the floorboard bottom panel 54 would then be further coupled to the rear cross member 122 and the floorboard front panel 58 would be coupled to forward cross member 126.

Since the DS and PS frame channels 62 and 74 are formed in the interior portion 66 of the floorboard 42, with the vehicle DS and PS frame struts 70 and 78 located therein, a considerable portion of the floorboard 42 is cantilevered, or suspended, outward beyond each frame strut 70 and 78 to the respective sides 86 and 90. The LDSRs 82 provide structural strength to support passenger loads on the cantilevered portions of the floorboard 42 Particularly, when the floorboard 42 is mounted to the frame struts 70 and 78 a DS cantilevered, or suspended, portion 130 of the floorboard 42 extends outward from the DS frame channel 62 to the DS side rail portion 94. Additionally, a PS cantilevered, or suspended, portion 134 extends outward from the PS frame channel 74 to the PS side rail portion 106. Each of the cantilevered portions 130 and 134 includes a plurality of long LDSRs 82 diagonally formed between the respective frame channels 62 and 74 and the respective side rails 94 and 106. If a low-speed side impact should occur, the long LDSRs 82 will absorb and rapidly broadly distribute the force generated by the impact along a length of the respective impact side frame strut 70 or 78.

The diagonal, criss-crossing formation of the long LDSRs 82 in the underside 50 of the floorboard 42 longitudinally disperse, or spread, and absorb the force imparted by a side impact along length of the impact side frame strut 70 or 78. The long LDSRs 82 are formed to have a thickness T, e.g., approximately 3 mm to 7 mm, and a depth D, e.g., approximately 10 cm to 20 cm, shown in FIG. 4. The thickness T and depth D are calculated so that the long LDSRs 82 will crumple, bend, collapse or break when an impact force, within a specific range, is imparted to either floorboard side 86 or 90, without causing damage to the frame struts 70 and 78. For example, the long LDSRs 82 will crumple due to an impact of approximately 1500 lbs to 1700 lbs, at approximately 5 mph to 25 mph to the DS or PS side 86 or 90 of the floorboard assembly 14, at an angle of approximately 5° to 50° to the respective side 86 or 90. In such a case, the structural integrity of the frame struts 70 and 78 will not be damaged and the damaged floorboard assembly 14 can be easily removed and replaced.

Conversely, the thickness T and the depth D of the long LDSRs 82 are calculated to absorb and withstand an impact force within a specific range without crumpling, bending, collapsing or breaking. For example, the long LDSRs 82 will absorb and withstand an impact to the DS or PS side 86 or 90 of the floorboard assembly 14 of approximately 1500 lbs to 1700 lbs, at approximately 1 mph to 10 mph, at an angle of approximately 5° to 50° to the respective side 86 or 90. Furthermore, the long LDSRs 82 are formed such that passenger loads applied to the top surface 46 of the cantilevered portions 130 and 134 are transferred to the DS and PS frame struts 70 and 78. More specifically, the thickness T and the depth D of the long LDSRs 82 are further calculated to provide sufficient structural support to carry and transfer the passenger loads applied to the cantilevered portions 130 and 134 to the frame struts 70 and 78 with minimal deflection of the cantilevered portions 130 and 134.

Referring now to FIGS. 4 and 5, in various embodiments, the floorboard 42 further includes a pedal box reservoir, or cavity, 138 formed in the driver side of the floorboard 42 for housing a the vehicle pedal box assembly 38. An exemplary pedal box assembly 38 is described in co-pending patent application, titled, "Modular Pedal Box Assembly", Ser. No. 11/163,844, filed Nov. 1, 2005, and assigned to the assignee of the present application. The pedal box reservoir 138 covers the underside of the pedal box assembly 38 to provide a protective shield against ground liquids, objects, and debris causing damage to, interference with or corrosion of accelerator pedal and brake pedal subassemblies. In some embodiments, the floorboard 42 is coupled to the forward most mounting flanges 118 by coupling, e.g., bolting, the pedal box assembly 38 to the forward most flanges 118, as shown in FIG. 5. That is, the fasteners used to connect the pedal box to the flanges 118, e.g., bolts, are inserted though the flanges 118 and through a bottom 142 of the pedal box reservoir 138, then coupled to the pedal box assembly 38. Therefore, the bottom of the pedal box reservoir 138 is retained between the pedal box assembly 38 and the flanges 118 when the pedal box is coupled to the flanges 118.

Referring to FIGS. 3 and 4, additionally, the pedal box reservoir 138 is formed to allow the DS frame strut 70 to intersect the pedal box reservoir 138 such that the reservoir 138 is divided into two sub-reservoirs. For example, the reservoir 138 can be divided into an accelerator subassembly sub-reservoir 138A and a brake subassembly sub-reservoir 138B. In various embodiments, the pedal box reservoir bottom 142 includes one or more drainage vents 146. The drainage vents 146 are adapted to allow fluids and liquids, e.g., water, to escape from within an interior of the pedal box reservoir 138 while simultaneously preventing liquid from entering the pedal box reservoir 138 from the underside 50 of the floorboard 42. For example, each drainage vent 146 can include a blocking baffle 150 that is formed to allow fluids and liquids to flow from the interior of the pedal box reservoir 138 out of the drainage vents 146. The blocking baffles 150 would also function to impede or substantially prevent fluids and liquids, e.g., mud and water, from entering the pedal box reservoir 138.

To protect the pedal box reservoir 138 from damage by a low-speed DS side impact, the floorboard includes arched rail portion 154 formed in the underside 50 between an outer side 156 of the pedal box reservoir 138 and the DS side rail 94. The arched rail portion 154 includes a plurality of closely spaced, short LDSRs 82 diagonally formed between an arched rail inner wall 158 and an arched rail outer wall 162. The diagonal formation of closely spaced, short LDSRs 82 and the curved formation of the arched rail inner and outer walls 158 and 162 create a substantially rigid and stiff arched rail portion 154. The arched rail portion 154 will effectively spread the force imparted by a low speed DS side impact around, or away from, the pedal box reservoir 138. Therefore, the arched rail portion 154 will impede or substantially prevent the force imparted by a low speed DS side impact from damaging the pedal box reservoir 138 and subsequently the pedal box assembly 38 housed within the pedal box reservoir 138.

Figure 6:
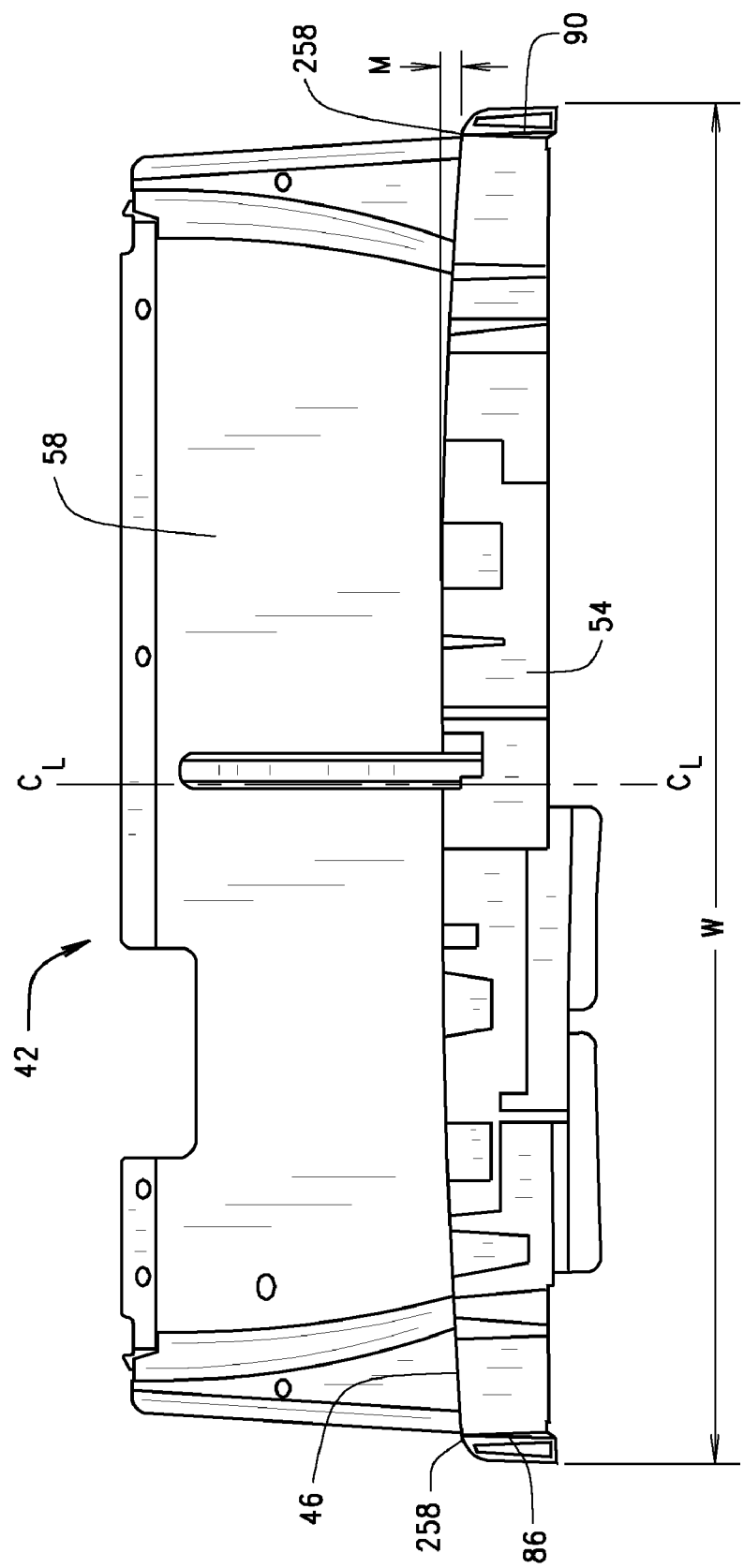
FIG. 6 is a rear cross-sectional view of the floorboard along a line 6-6 of FIG. 5, illustrating an arched top surface of the floorboard.

Referring to FIG. 6, the floorboard bottom panel 54 is formed such that the top surface 46 is arched across the width W of the bottom panel 54 from the DS side 86 to the PS side 90. Specifically, the bottom panel top surface 46 has a longitudinal crest along the center line $C_L$, also shown in FIG. 2, that is a distance M above longitudinal edges 258 of the top surface 46. For example, the distance M can be approximately 0.5 inches (1.3 cm) to 1.5 inches (3.8 cm). The arched top surface allows fluids and liquids, e.g., water and beverages, to be shed from the top surface 46. That is, fluids and liquids will flow from the longitudinal crest toward the floorboard edges 258 and off the floorboard top surface 46. The shedding of fluids and liquids from the top surface 46 assists in cleaning the floorboard 42 and preventing the top surface 46 from becoming slippery.

Figure 7:
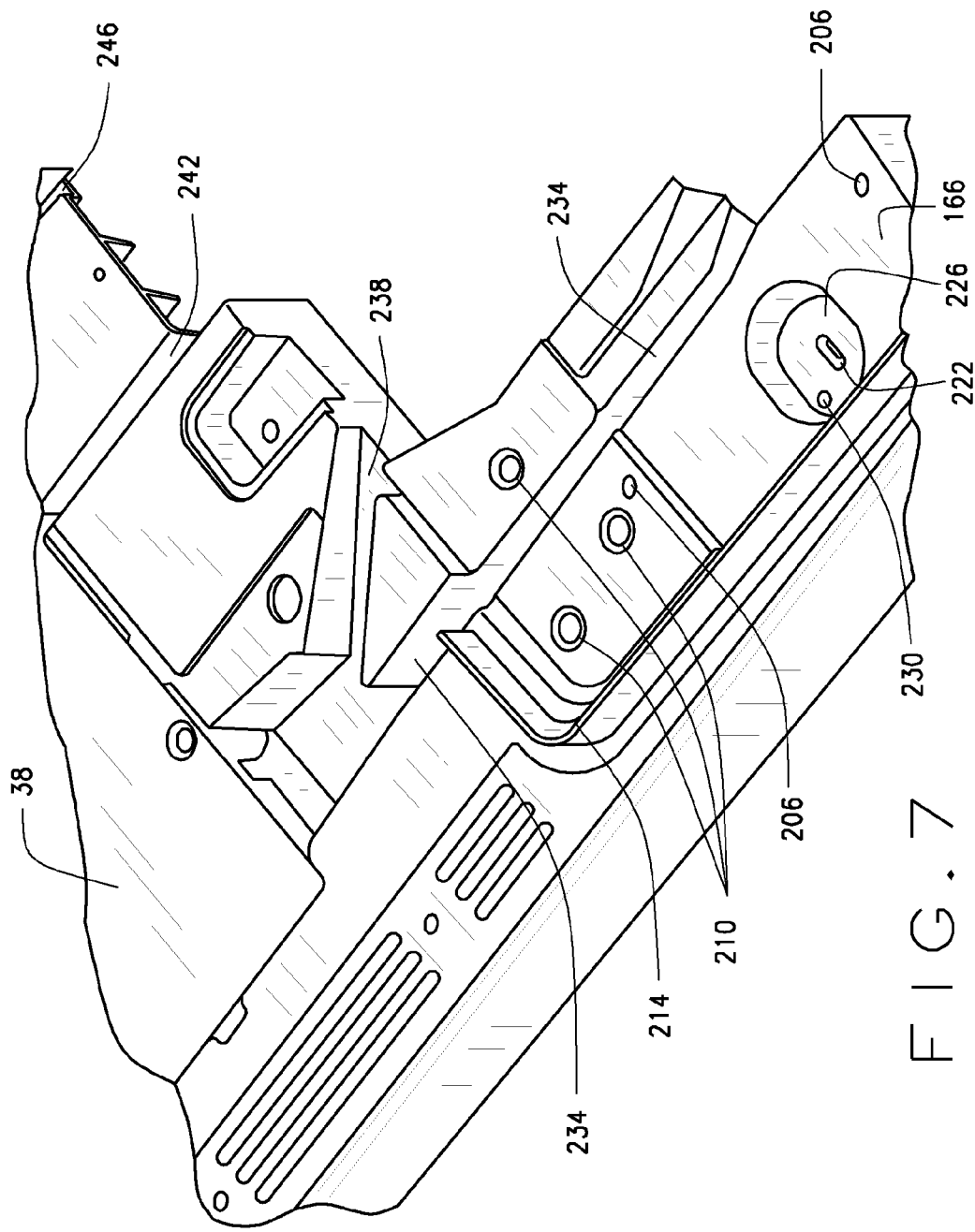
FIG. 7 is a sectional view of the floorboard shown in FIG. 2, illustrating a driver side component platform.
Figure 8:
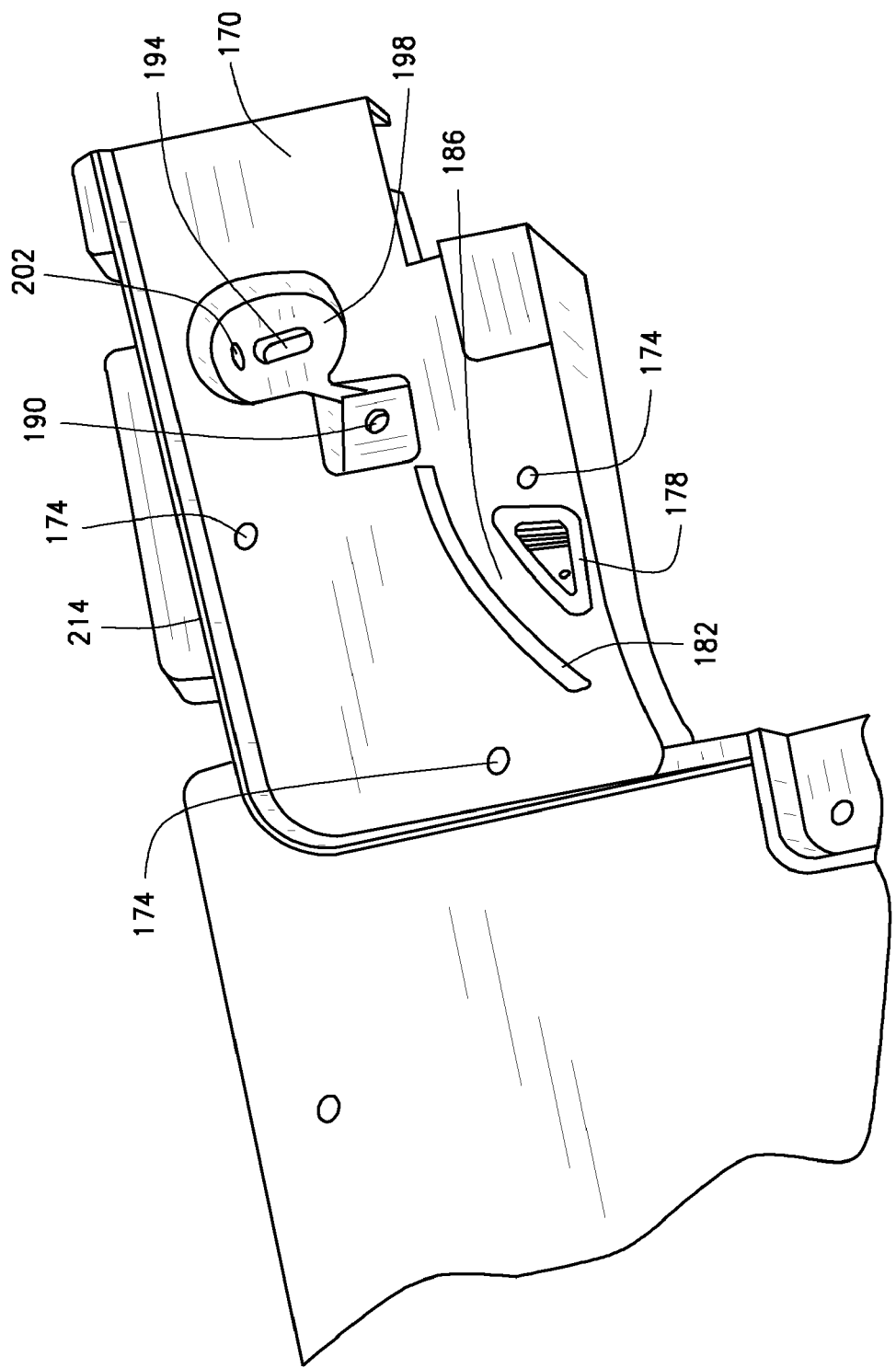
FIG. 8 is a sectional view of the floorboard shown in FIG. 2, illustrating a passenger side component platform.

Referring now to FIGS. 5, 7 and 8, the floorboard 42 includes a DS component platform 166 and a PS component platform 170 extending from a rear of the bottom panel 54. Each of the PS and DS component platforms 166 and 170 are for attaching vehicle components to the floorboard, e.g., a fuel tank, a battery, a controller and an air box. In various embodiments, the PS component platform is adapted for mounting, e.g., bolting, riveting or snap fitting, a fuel tank (not shown) to the floorboard 42 using mounting holes 174. To aid in supporting at least a portion of the fuel tank the PS component platform 170 has formed therein a support pedestal 178. The support pedestal 178 can be any body or appendage formed in the PS component platform 170, e.g., a triangular walled body, as illustrated in FIG. 8. In various other embodiments, the PS component platform 170 is adapted for mounting a vehicle electronic controller (not shown) to the floorboard 42 using at least one mounting hole 174 and a controller mounting hole 190.

The PS component platform 170 additionally includes a guide wall 182 located in close proximity to the fuel tank pedestal 178. The guide wall 182 forms a cable guide channel 186 between the guide wall 182 and the fuel tank pedestal 178. The cable guide channel 186 is adapted to receive at least one brake cable or wire, thereby protecting the brake cable/wire and preventing the brake cable/wire from moving about the PS component platform under the fuel tank or vehicle controller. As further illustrated in FIG. 3, the floorboard 42 is mounted to the PS rear most mounting flange 118 via a PS frame mounting slot 194 within a PS frame mounting recess 198 formed in the PS component platform 170. The floorboard 42 is connected to the rear most PS mounting flange 118 using a fastener, e.g., a nut and bolt, inserted through the PS frame mounting slot 194. In some embodiments, the PS frame mounting recess 198 includes a drain hole 202 formed therein to allow fluids, e.g., water, to drain from within the PS frame mounting recess 198.

In various embodiments, the DS component platform 166 is utilized as a battery platform for mounting a battery (not shown) to the floorboard 42. The battery could be mounted on the DS component platform 166 using any suitable mounting means. For example, a battery tie-down bracket that holds the battery in place could be connected, e.g., bolted or screwed, to DS component platform 166 using mounting holes 206. Additionally, in some embodiments, an air box (not shown) is mounted, e.g., bolted, riveted or snap fitted, to the DS component platform 166 via air box mounting holes 210. As further illustrated in FIG. 3, the floorboard 42 is mounted to the DS rear most mounting flange 118 via a DS frame mounting slot 222 within a DS frame mounting recess 226 formed in the DS component platform 166. The floorboard 42 is connected to the rear most DS mounting flange 118 using a fastener, e.g., a nut and bolt, inserted through the DS frame mounting slot 222. In some embodiments, the DS frame mounting recess 226 includes a drain hole 230 formed therein to allow fluids, e.g., water, to drain from within the frame mounting recess 226.

Figure 9:
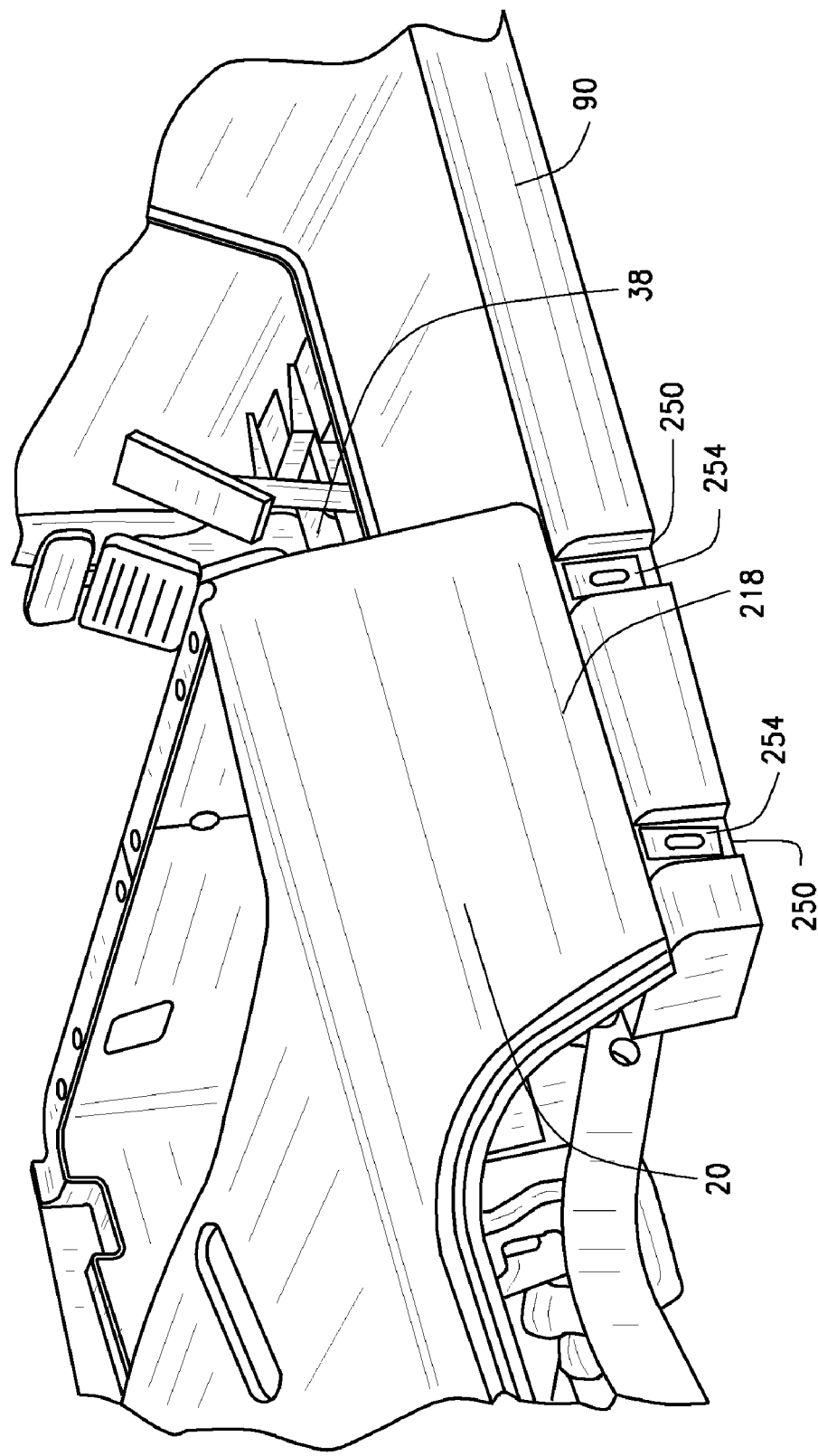
FIG. 9 is a sectional view of the floorboard shown in FIG. 2, illustrating at least one body mounting recess formed in a side of the floorboard.

Each of the DS and PS component platforms 166 and 170 include a body support wall 214 that is formed to provide support and alignment for a bottom lip 218, shown in FIG. 9, of a rear body section 20 of the utility vehicle 10. When the rear body section 20 is mounted on the floorboard 42, the bottom lip 218 effectively rests against the support walls 214 such that the body support walls 214 lend support and alignment to the bottom lip 218. The support walls 214 additionally provide a barrier to fluids and liquids, e.g., water and beverages, from flowing under the rear body section bottom lip 218 and possibly causing damage to components mounted to the component platforms 166 and 170.

Referring to FIGS. 5 and 7, the floorboard 42 further includes a first brake cable channel 234 that extends from the pedal box reservoir 138, e.g., the brake pedal subassembly sub-reservoir 138B, to the rear edge of the DS component platform 166. A second brake cable channel 238 is formed in the floorboard 42 that extends from the pedal box reservoir 138, e.g., the brake pedal subassembly sub-reservoir 138B, to a rear edge of the interior portion 66 of the floorboard bottom panel 54. The first and second brake cable channels 234 and 238 are for locating, or housing, at least one brake cable or wire therein and for protecting the brake cables or wires from damage by ground debris and liquids. An accelerator cable channel 242 is similarly formed in the floorboard 42 for locating, or housing, an accelerator cable or wire therein. The accelerator cable channel 242 extends from the pedal box reservoir 138, e.g., the accelerator pedal subassembly sub-reservoir 138A, to the rear edge of the interior portion 66 of the floorboard bottom panel 54 and protects the accelerator cable from damage by ground debris and liquids.

Furthermore, a control wire harness channel 246 is formed in the floorboard 42 for locating a vehicle control wire harness therein and for protecting the control wire harness from damage by ground debris and liquids. The control wire harness channel 246 extends from a point approximately near a top center of the front panel 58, down along the front panel 58 and longitudinally across the bottom panel 54 to the rear edge of the interior portion 66 of the floorboard bottom panel 54. In some embodiments, the brake cable channels 234 and 238, and/or the accelerator channel 242, and/or the control wire harness channel 246 include drain holes in the bottom of the respective channels to allow fluids and liquids to drain from the respective channels.

Referring now to FIGS. 5 and 9, the bottom panel 54 of the floorboard 42 includes at least one body mounting recess 250 along each of the DS and PS floorboard sides 86 and 90. More particularly, the body mounting recesses 250 are formed in the DS and PS floorboard sides 86 and 90 adjacent the respective DS and PS component platforms 166 and 170. Each body mounting recess 250 is adapted to receive at least one mounting tab 254 of a rear body section 20 of the utility vehicle to couple the rear body section 20 to the floorboard 42. The mounting tabs 254 can be coupled to the floorboard 42, within the body mounting recesses 250 using any suitable fasteners such as nuts and bolts, rivets, self-threading fasteners or snap-in push pins.

Figure 10:
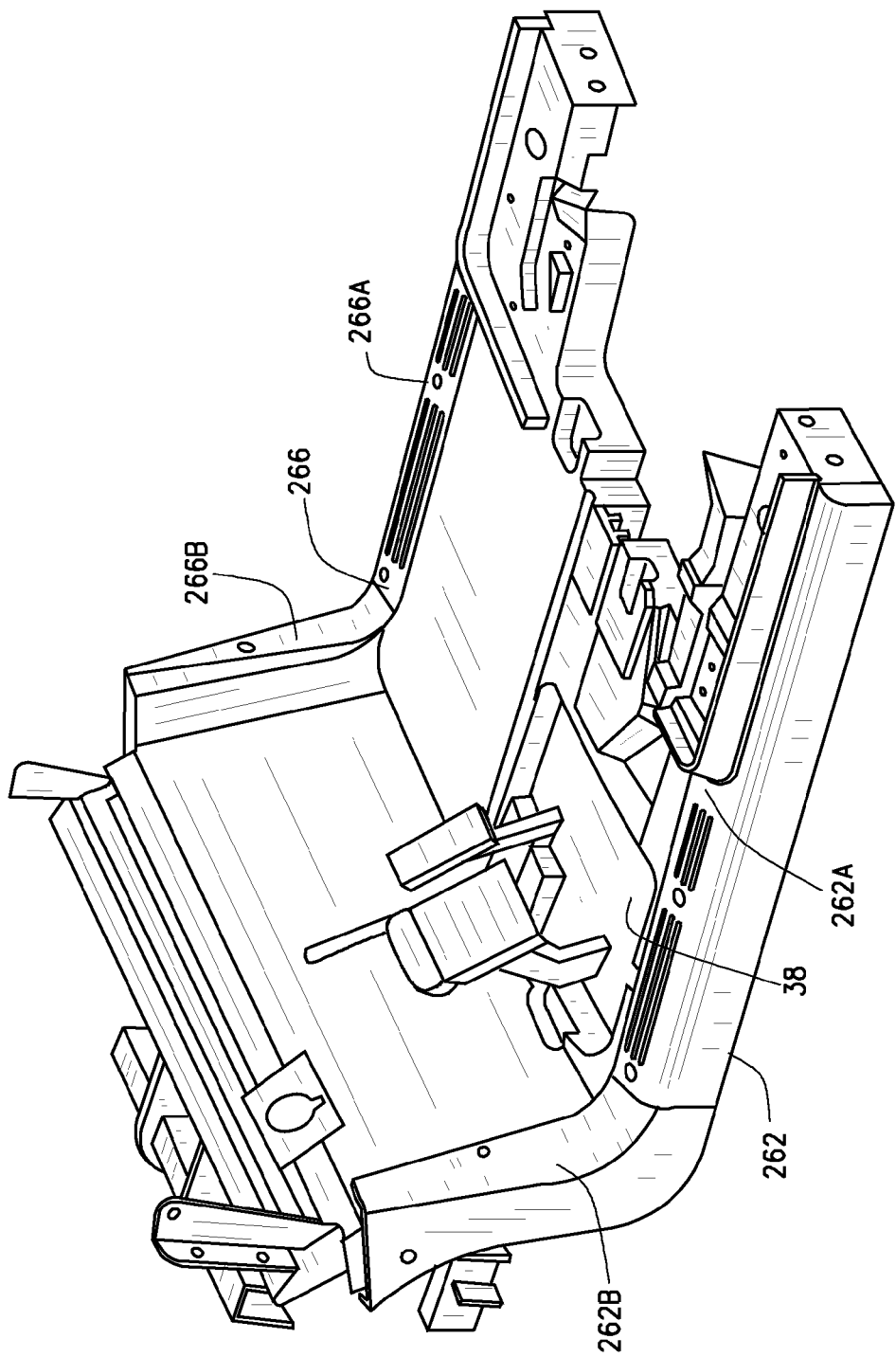
FIG. 10 is an isometric view of the floorboard assembly shown in FIG. 1, illustrating a pair of two-piece rocker panel subassemblies included in the floorboard assembly shown in FIG. 1.

Referring to FIGS. 3 and 10, the floorboard assembly 14 includes a DS rocker panel subassembly 262 coupled to the DS side 86 of the floorboard 42. The DS rocker panel subassembly 262 is a two-piece subassembly including a bottom panel portion 262A and a front panel portion 262B. Similarly, the floorboard assembly 14 includes a PS rocker panel subassembly 266 coupled to the PS side 90 of the floorboard 42. The DS rocker panel subassembly 266 is also a two-piece subassembly including a bottom panel portion 266A and a front panel portion 266B. The DS and PS rocker panel subassemblies 262 and 266 can be coupled to the respective floorboard sides 86 and 90 using any suitable fasteners such as nuts and bolts, rivets, self-threading fasteners or snap-in push pins. The DS and PS rocker panel assemblies 262 and 266 provide an aesthetic accent to the floorboard assembly 14 and also provide a scuff and scratch barrier for the floorboard assembly 14 that can be easily removed and replaced.

Figure 11:
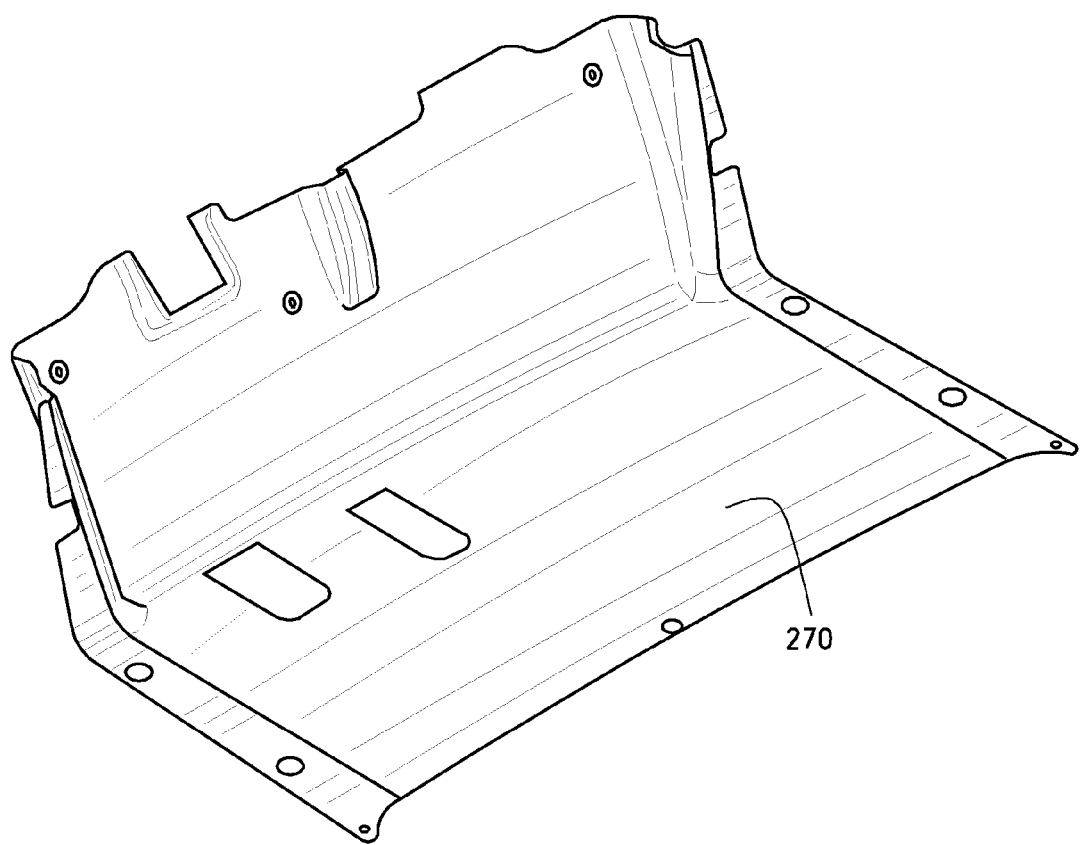
FIG. 11 is an isometric view of a floor mat included in the floorboard assembly shown in FIG. 1.
Figure 12:
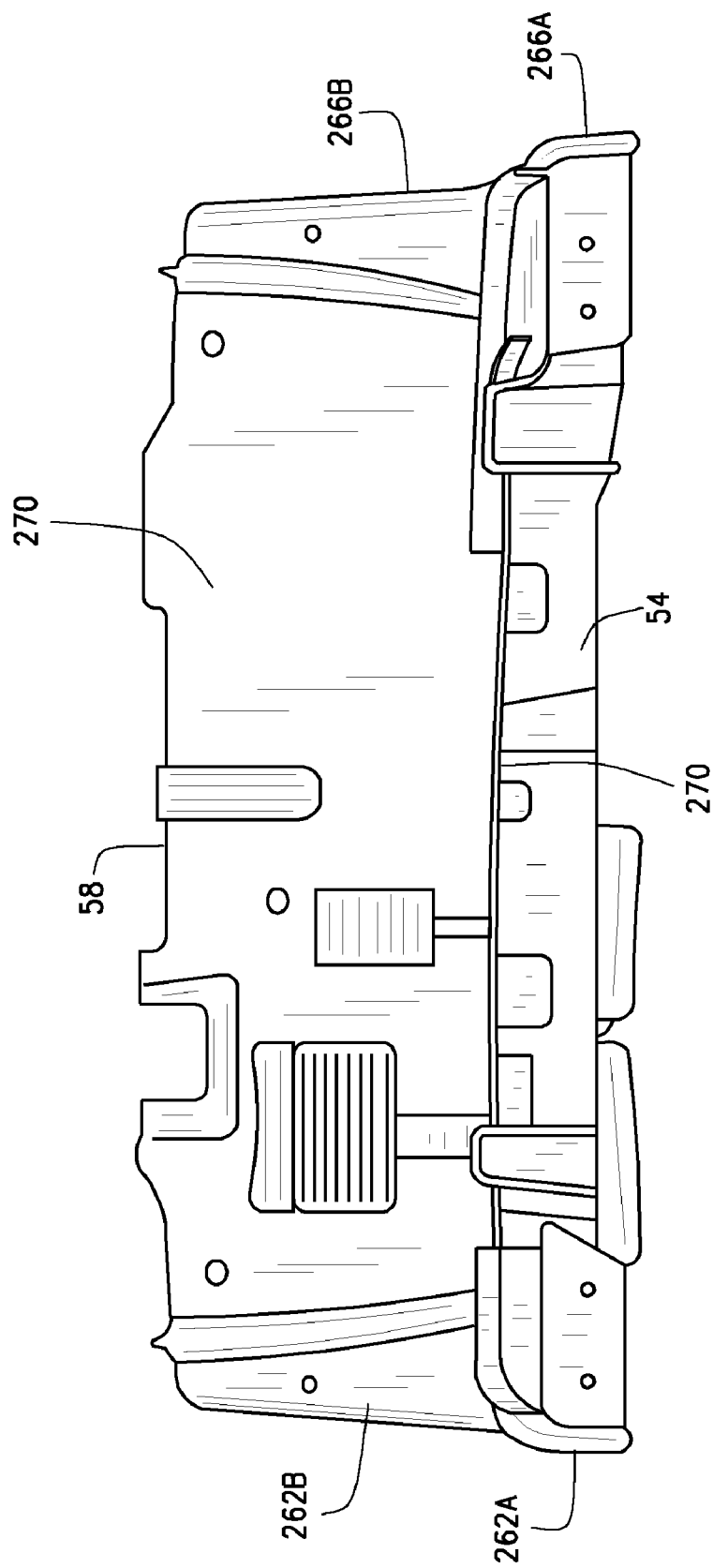
FIG. 12 is a rear view of the floorboard assembly shown in FIG. 1 including the floor mat shown in FIG. 11.

Referring now to FIGS. 11 and 12, the floorboard assembly 14 further includes a one-piece floor mat 270 coupled to the front and bottom panels 58 and 54 of the floorboard 42. The floor mat 270 conforms to and covers the arched top surface 46 of the floorboard 42 to protect the top surface 46 from damage and scuffing. The floor mat 270 can be fabricated from any suitable material such as rubber or vinyl. The floor mat 270 can be coupled to the floorboard front and bottom panels 58 and 54 using any suitable fasteners such as nuts and bolts, rivets, self-threading fasteners or snap-in push pins.

Thus, the present disclosure provides light-weight utility vehicle floorboard assembly that includes a molded one-piece floorboard having formed therein many features designed to protect and easily locate, mount and replace, if necessary, various components of the floorboard assembly and the utility vehicle. Additionally, the molded one-piece floorboard is designed to sustain a low-speed side impact without damaging the floorboard assembly. Or, more particularly, the floorboard is designed to absorb and distribute the force of a low-speed side impact without imparting damage to the frame structure of the utility vehicle to which the floorboard is mounted.

The description herein is merely exemplary in nature and, thus, variations that do not depart from the gist of that which is described are intended to be within the scope of the disclosure. Such variations are not to be regarded as a departure from the spirit and scope of the disclosure.

What is claimed is:

1. A light-weight utility vehicle floorboard comprising:
   a pair of frame channels formed in an interior portion of the floorboard that receive a pair of vehicle frame struts therewithin;
   a plurality of load dispersing structural ribs (LDSRs) formed between the frame channels and sides of the floorboard that spread a force generated by a side impact to the floorboard such that the vehicle frame struts are not damaged; and a side rail portion along each side of the floorboard, each side rail portion including a plurality of closely spaced, short LDSRs diagonally formed between a side rail outer wall and a side rail inner wall.

2. The floorboard of claim 1, wherein the LDSRs provide structural rigidity and strength for transferring passenger loads from the sides of the floorboard between to the frame channels.

3. The floorboard of claim 1 further comprising a cantilevered portion extending outward from each frame channel to the corresponding side rail portion, each cantilevered portion comprising a plurality of long LDSRs diagonally formed between the respective frame channel and the respective side rail.

4. The floorboard of claim 1 further comprising a pedal box reservoir formed in a driver-side of the floorboard.

5. The floorboard of claim 4 further comprising an arched rail portion between an outer side of the pedal box reservoir and the corresponding side rail, the arched rail portion including a plurality of closely spaced, short LDSRs between an arched rail outer wall and an arched rail inner wall.

6. The floorboard of claim 4, wherein the pedal box reservoir comprises at least one drainage vent.

7. The floorboard of claim 1 further comprising a driver-side component platform for attaching vehicle components to the floorboard, the driver-side component platform including a support wall for supporting a bottom lip of a rear body section of the utility vehicle.

8. The floorboard of claim 7, wherein the driver-side component platform comprises a battery platform for mounting a battery to the floorboard.

9. The floorboard of claim 7, wherein the driver-side component platform comprises an air box platform for mounting an air box to the floorboard.

10. The floorboard of claim 1, wherein each side of the floorboard includes at least one body mount recess.

11. The floorboard of claim 1 further comprises an arched top surface.

12. A light-weight utility vehicle floorboard comprising:
a pair of frame channels formed in an interior portion of the floorboard that receive a pair of vehicle frame struts therewithin;
a plurality of load dispersing structural ribs (LDSRs) formed between the frame channels and sides of the floorboard that spread a force generated by a side impact to the floorboard such that the vehicle frame struts are not damaged; and
a passenger-side component platform for attaching vehicle components to the floorboard, the passenger-side component platform including a support wall for supporting a bottom lip of a rear body section of the utility vehicle,
wherein the passenger-side component platform comprises a fuel tank platform for mounting a fuel tank to the floorboard, the fuel tank platform including a fuel tank support pedestal for supporting a portion of the fuel tank and a guide wall located in close proximity to the fuel tank pedestal to form a cable guide channel between the guide wall and the fuel tank pedestal.

13. The floorboard of claim 12, wherein the passenger-side component platform comprises a vehicle controller platform for mounting a vehicle controller to the floorboard.

14. A light-weight utility vehicle floorboard comprising:
a pair of frame channels formed in an interior portion of the floorboard that receive a pair of vehicle frame struts therewithin;
a plurality of load dispersing structural ribs (LDSRs) formed between the frame channels and sides of the floorboard that spread a force generated by a side impact to the floorboard such that the vehicle frame struts are not damaged; and
at least one of:
at least one brake cable channel for locating at least one brake cable therein;
an accelerator cable channel for locating an accelerator cable therein; or
a control wire harness channel for locating a vehicle control wire harness therein.

15. A floorboard assembly for a tight-weight utility vehicle, said floorboard assembly comprising:
a one-piece molded floorboard having a bottom panel and a front panel extending upwardly from a front of the bottom panel, the bottom panel having:
a driver-side (DS) frame channel formed in an interior portion of the floorboard for receiving a DS vehicle frame strut therewithin;
a passenger-side (PS) frame channel formed in the interior portion of the floorboard for receiving a PS vehicle frame strut therewithin;
a plurality of load dispersing structural ribs (LDSRs) formed between the DS frame channel and a DS side of the floorboard and between the PS frame channel and a PS side of the floorboard, the LDSRs for spreading a force generated by a side impact to the floorboard such that the DS and PS frame struts are not damaged and for providing structural strength to support passenger loads between the DS and PS frame channels and the respective sides of the floorboard;
a one-piece floor mat coupled to the front and bottom panels for covering a top surface of the floorboard; and
a DS side rail portion along the DS side and a PS side rail portion along the PS side, each side rail portion including a plurality of closely spaced, short LDSRs diagonally formed between a side rail outer wall and a side rail inner wall that provide substantial rigidity and stiffness along the respective floorboard sides.

16. The floorboard assembly of claim 15 further comprising a DS cantilevered portion extending outward from the DS frame channel to the DS side rail portion, and a PS cantilevered portion extending outward from the PS frame channel to the PS side rail portion, each cantilevered portion comprising a plurality of long LDSRs diagonally formed between the respective frame channels and the respective side rails for broadly distributing the force generated by a side impact along a length of the respective impact side frame strut and for transferring the passenger loads to the DS and PS frame struts.

17. The floorboard assembly of claim 15 further comprising a pedal box reservoir formed in a driver side of the floorboard for housing a vehicle pedal box assembly and protecting the pedal box assembly from damage by ground debris and liquids.

18. The floorboard assembly of claim 17 further comprising an arched rail portion between an outer side of the pedal box reservoir and the DS side rail for protecting the pedal box reservoir from damage due to a DS side impact, the arched rail portion including a plurality of closely spaced, short LDSRs between an arched rail outer wall and an arched rail inner wall.

19. The floorboard assembly of claim 17, wherein the pedal box reservoir comprises at least one drainage vent adapted to allow liquid to escape from within an interior of the pedal box reservoir and to prevent liquid from entering the pedal box reservoir from under the utility vehicle.

20. A floorboard assembly for a light-weight utility vehicle, said floorboard assembly comprising:
 a one-piece molded floorboard having a bottom panel and a front panel extending upwardly from a front of the bottom panel, the bottom panel having:
 a driver-side (DS) frame channel formed in an interior portion of the floorboard for receiving a DS vehicle frame strut therewithin;
 a passenger-side (PS) frame channel formed in the interior portion of the floorboard for receiving a PS vehicle frame strut therewithin;
 a plurality of load dispersing structural ribs (LDSRs) formed between the DS frame channel and a DS side of the floorboard and between the PS frame channel and a PS side of the floorboard, the LDSRs for spreading a force generated by a side impact to the floorboard such that the DS and PS frame struts are not damaged and for providing structural strength to support passenger loads between the DS and PS frame channels and the respective sides of the floorboard;
 a one-piece floor mat coupled to the front and bottom panels for covering a top surface of the floorboard; and
 a PS component platform and a DS component platform extending from a rear of the bottom panel, the PS and DS component platforms for attaching vehicle components to the floorboard, each component platform includes a support wall for supporting a bottom lip of a rear body section of the utility vehicle;
  wherein the PS component platform comprises one of a fuel tank platform for mounting a fuel tank to the floorboard, the fuel tank platform including a fuel tank support pedestal for supporting a portion of the fuel tank and a guide wall located in close proximity to the fuel tank pedestal to form a cable guide channel between the guide wall and the fuel tank pedestal; or
  a vehicle controller platform for mounting a vehicle controller to the floorboard.

21. The floorboard assembly of claim 15, wherein each side of the floorboard includes at least one body mount recess for receiving at least one mounting tab of a rear body section of the utility vehicle to couple the rear body section to the floorboard.

22. The floorboard assembly of claim 15, wherein the bottom panel top surface is arched such that liquids will flow from a longitudinal crest of the floorboard toward the floorboard edges.

23. The floorboard assembly of claim 15 further comprising:
 a DS rocker panel subassembly including a front panel portion and a bottom panel portion that are coupled to a DS side of the floorboard; and
 a PS rocker panel subassembly including a front panel portion and a bottom panel portion that are coupled to a PS side of the floorboard.

24. The floorboard assembly of claim 20, wherein the DS component platform comprises at least one of:
 a battery platform for mounting a battery to the floorboard; or
 an air box platform for mounting an air box to the floorboard.

25. A floorboard assembly for a light-weight utility vehicle, said floorboard assembly comprising:
 a one-piece molded floorboard having a bottom panel and a front panel extending upwardly from a front of the bottom panel, the bottom panel having:
 a driver-side (DS) frame channel formed in an interior portion of the floorboard for receiving a DS vehicle frame strut therewithin;
 a passenger-side (PS) frame channel formed in the interior portion of the floorboard for receiving a PS vehicle frame strut therewithin;
 a plurality of load dispersing structural ribs (LDSRs) formed between the DS frame channel and a DS side of the floorboard and between the PS frame channel and a PS side of the floorboard, the LDSRs for spreading a force generated by a side impact to the floorboard such that the DS and PS frame struts are not damaged and for providing structural strength to support passenger loads between the DS and PS frame channels and the respective sides of the floorboard; and
 a one-piece floor mat coupled to the front and bottom panels for covering a top surface of the floorboard; and
 at least one of:
  at least one brake cable channel for locating at least one brake cable therein and for protecting the brake cable from damage by ground debris and liquids;
  an accelerator cable channel for locating an accelerator cable therein and for protecting the accelerator cable from damage by ground debris and liquids; or
  a control wire harness channel for locating a vehicle control wire harness therein and for protecting the control wire harness from damage by ground debris and liquids.

* * * * *

UNITED STATES PATENT AND TRADEMARK OFFICE
CERTIFICATE OF CORRECTION

| | | |
|---|---|---|
| PATENT NO. | : 7,695,056 B2 | Page 1 of 1 |
| APPLICATION NO. | : 11/381907 | |
| DATED | : April 13, 2010 | |
| INVENTOR(S) | : Donald S. Hanson, Jr. et al. | |

It is certified that error appears in the above-identified patent and that said Letters Patent is hereby corrected as shown below:

Column 4, line 45 (application page 9, line 12) "floorboard 42 Particularly" should be --floorboard 42. Particularly--.

Column 5, line 30 (application page 11, line 8) "housing a the vehicle" should be --housing the vehicle--.

Column 10, line 11 (application page 7, line 1) "tight-weight" should be --light-weight--.

Signed and Sealed this

Twenty-ninth Day of June, 2010

David J. Kappos
*Director of the United States Patent and Trademark Office*